United States Patent
Venuto (10) Patent No.: US 8,942,113 B2
(45) Date of Patent: Jan. 27, 2015

(54) SYSTEM AND METHOD FOR DYNAMICALLY ADJUSTING ROUTING METRICS BASED ON POWER CONSUMPTION

(75) Inventor: John C. Venuto, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 407 days.

(21) Appl. No.: 12/437,105

(22) Filed: May 7, 2009

(65) Prior Publication Data
US 2010/0284287 A1 Nov. 11, 2010

(51) Int. Cl.
H04L 12/26 (2006.01)
H04L 12/24 (2006.01)
H04L 12/721 (2013.01)
H04W 40/08 (2009.01)

(52) U.S. Cl.
CPC .......... *H04L 41/0833* (2013.01); *H04L 45/123* (2013.01); *H04W 40/08* (2013.01)
USPC ........... 370/252; 370/400; 370/235; 370/401; 370/313; 370/318; 455/7; 455/11.1; 455/445; 455/522; 713/320; 713/324

(58) Field of Classification Search
USPC ......... 370/252, 400, 235, 310, 241, 313, 318, 370/401, 331, 254; 455/7, 11.1, 445, 522; 713/320, 324
See application file for complete search history.

(56) References Cited

U.S. PATENT DOCUMENTS

| | | | |
|---|---|---|---|
| 7,043,252 B2* | 5/2006 | Khitrik et al. | 455/452.2 |
| 7,493,132 B2* | 2/2009 | Malladi et al. | 455/522 |
| 2001/0053696 A1* | 12/2001 | Pillai et al. | 455/445 |
| 2006/0034252 A1* | 2/2006 | Karaoguz et al. | 370/351 |
| 2006/0056302 A1* | 3/2006 | Ahn et al. | 370/238 |
| 2006/0215582 A1* | 9/2006 | Castagnoli et al. | 370/254 |
| 2007/0070983 A1* | 3/2007 | Redi et al. | 370/352 |
| 2009/0067331 A1* | 3/2009 | Watsen et al. | 370/235 |
| 2009/0068969 A1* | 3/2009 | Lindoff et al. | 455/161.1 |
| 2009/0207753 A1* | 8/2009 | Bieganski | 370/254 |
| 2009/0259345 A1* | 10/2009 | Kato et al. | 700/295 |

* cited by examiner

*Primary Examiner* — Jamal Javaid (57) ABSTRACT

An approach is provided for optimizing power consumption and costs associated with routing information over a transport environment. A first collection interval corresponding to retrieval of a first data set specifying power consumption information and associated cost information for a plurality of routing nodes is determined. The first data set is compared with a second data set specifying power consumption information and associated cost information for a second collection interval. Routing metrics of the plurality of routing nodes are determined based on the comparison, wherein the routing metrics specify relative desirability of the plurality of routing nodes for establishing one or more communication paths formed by one or more of the plurality of routing nodes based on the routing metrics.

18 Claims, 7 Drawing Sheets

SYSTEM AND METHOD FOR DYNAMICALLY ADJUSTING ROUTING METRICS BASED ON POWER CONSUMPTION

BACKGROUND INFORMATION

Routing transmission units (e.g., blocks, cells, frames, packets, etc.) over a transport environment (or communication network) from one end device to another entails selecting routing (or communication) paths established by one or more intermediate routing nodes (e.g., bridges, firewalls, gateways, routers, switches, etc.) of the transport environment. Typically, these intermediate routing nodes forward transmission units based on routing tables which maintain routing information, such as available adjacent routing nodes, destination/next hop associations, desirability of particular routing paths, etc. Routing tables are usually constructed utilizing routing algorithms seeking to optimize one or more routing metrics (or standards of measurement, e.g., available bandwidth, congestion, hop count, latency, reliability, speed, and the like) for determining an optimal (or, at least, a most desirable) routing path to a predetermined destination. Thus, routing may be considered to involve two basic activities, i.e., first determining optimal routing paths and then transporting transmission units over the transport environment based on the determined optimal routing paths. Traditionally, other relevant cost factors have not been considered largely because of lack of integration with other systems external to the routing network, thereby masking true costs of certain communication paths.

Therefore, there is a need for an approach that provides for effective and efficient techniques to determine routing metrics that are reflective of costs other than communications considerations.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for optimizing power consumption and associated costs corresponding to routing transmission units over transport environments are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
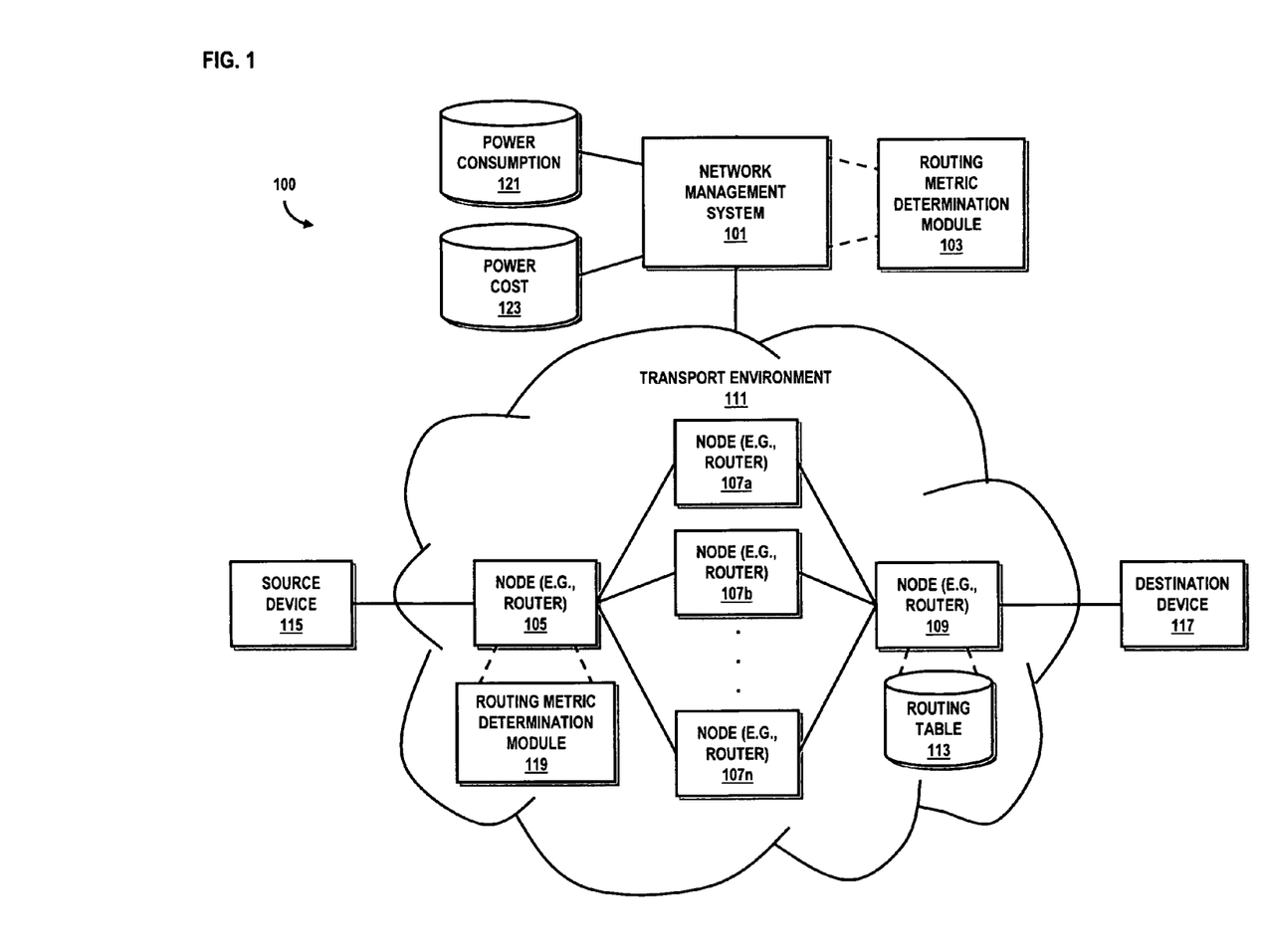
FIG. 1 is a diagram of a system capable of optimizing power consumption and associated costs for routing transmission units over a transport environment via one or more routing nodes, according to an exemplary embodiment.

FIG. 1 is a diagram of system capable of optimizing power consumption and associated costs for routing transmission units over a transport environment via one or more routing nodes, according to an exemplary embodiment. It is noted that energy costs will continue to affect many facets of modern technology. As efforts to conserve energy become more acute and the cost of power increases, the determination of optimal routing paths need to become more attuned to the dynamics of power consumption and associated costs corresponding to routing transmission units over transport environments. Traditionally, however, routing protocols have lacked such emphasis or considerations.

For the purposes of illustration, system 100 is described with respect to network management system 101, including routing metric determination module 103, configured to determine, based on power consumption information and associated cost information for a plurality of routing nodes (e.g., e.g., bridges, firewalls, gateways, routers, switches, etc) 105, 107a, 107b, . . . , 107n, and 109, routing metrics utilized by one or more of routing nodes 105-109 for routing one or more transmission units (e.g., blocks, cells, frames, packets, etc.) over transport environment 111. In this manner, the routing metrics may be utilized by routing nodes 103-107 to develop routing tables 113 that provide optimal routing (or communication) paths for routing the one or more transmission units from source devices (e.g., source device 115) to destination devices (e.g., destination device 117) in such a way as to reduce, or otherwise optimize, the power consumption and associated costs of routing the one or more transmission units over transport environment 111. It is also contemplated that routing metrics may be determined at, or in conjunction with, one or more of routing nodes 105-109 via routing metric determination modules 119 of routing nodes 105-109. While specific reference will be made hereto, it is contemplated that system 100 may embody many forms and include multiple and/or alternative components and facilities.

It is observed that as the cost of energy increases and conservation efforts become more acute, network operators will be seeking new ways to conserve power and reduce associated costs on their transport environments. Moreover, as the cost for power increases, power companies are developing new pricing structures to manage their output more efficiently while maximizing their bottom line, such as pricing structures that dynamically change during periods of high or low demand or supply. For instance, a power company may charge one particular rate per kilowatt hour from one to two o'clock in the afternoon and another particular rate per kilowatt hour from one to two o'clock in the morning. In other instances, power companies may provide customers certain financial incentives for reducing power consumption during certain peak demand times.

Therefore, the approach according to certain embodiments of system 100 stems from the recognition that dynamically updating routing metrics based on power consumption and associated cost information corresponding to routing nodes of a transport environment, provides an effective and efficient technique to reduce (or otherwise optimize) power consumption for routing transmission units over a transport environment, as well as take advantage of dynamic pricing structures of or incentives provided by power companies.

It is to be appreciated that routing nodes 105-109 require power in order to operate, i.e., in order to route transmission units over transport environment 111 from source devices (e.g., source device 115) to destination devices (e.g., destination device 117). In this manner, network operators may contract with one or more power companies (not shown) for providing power to routing nodes 103-107 at certain costs or cost structures. It is also to be appreciated that transport environment 111 may span one or more geographical regions and, therefore, routing nodes 105-109 may be subject to varying environments, routing demands, loading conditions, cost structures, etc. As such, various routing paths may exist, whereby, one routing path over another may be better for reducing (or otherwise optimizing) power consumption and/or associated costs for routing transmission units from a source device 115 to a destination device 117 via one or more routing nodes 105-109 of transport environment 111.

Accordingly, network management system 101, in exemplary embodiments, may be configured to consolidate and converge power consumption and power cost information (or data) corresponding to one or more routing nodes (e.g., routing nodes 105-109) associated with transport environment 111. In this manner, network management system 101 may determine one or more collection intervals corresponding to retrieving the power consumption and power cost information of routing nodes 105-109. In certain instances, power consumption information (e.g., kilowatts consumed) may be retrieved (or received) from routing nodes 105-109 or a facility (not shown) supporting routing nodes 105-109. As such, the power consumption information may also correspond to the power consumed in efforts to maintain routing nodes 105-109 at the facilities, such as the power consumed to heat, cool, light, etc., the facilities. Power cost information (e.g., cost per kilowatt hour, effective time intervals, effective geographic regions, etc.) may be retrieved (or received) from one or more power companies providing power to routing nodes 105-109 or the facilities associated therewith. As such, the power consumption and/or power cost information may be received in real-time, periodically, or in an on-demand fashion. Further, the power consumption and power cost information may be stored in any suitable storage location or memory, such as power consumption repository 121 and power cost repository 123.

In exemplary embodiments, network management system 101 may be configured to utilize the power consumption information and associated power cost information to determine (or otherwise update) routing metrics utilized by routing nodes 105-109 to route transmission units over transport environment 111. According to particular implementations, network management system 101 determines the routing metrics for one or more of routing nodes 105-109 based on comparing a first data set specifying power consumption information and associated power cost information of routing nodes 105-109 corresponding to a first collection interval with a second data set specifying power consumption information and associated power cost information of routing nodes 105-109 corresponding to a second collection interval. The first collection interval may relate to real-time information and the second collection interval may relate to historical information, or vice versa. In this manner, the routing metrics may be determined based upon dynamic fluctuations in power consumption, fluctuations in associated power cost information, or a combination thereof. Moreover, the routing metrics may be determined based on a weighting between power consumption information and associated power cost information. Accordingly, the routing metrics may be utilized to specify relative desirability of routing nodes 105-109 for establishing one or more routing (or communication paths) over transport environment 111 via one or more of routing nodes 105-109. In this manner, the desirability of one routing node over another may be incremented (e.g., increased, decreased, etc.) either by direct correlation, by percentages, or logarithmically.

According to particular embodiments, network management system 101 may advertise the routing metrics to routing nodes 105-109 for generating (or updating) routing tables, e.g., routing table 113, for selecting routing paths for forwarding transmission units to a "next hop" routing node (e.g., 107*a*) or destination device 117. Thus, the information stored to routing table 113 may include routing metrics associated with reducing or optimizing power consumption and/or associated cost for routing transmission units over transport environment 111, as well as one or more other routing metrics for optimizing parameters, such as available bandwidth, congestion hop count, latency, reliability, speed, and the like.

Routing nodes 105-109, source devices 115, and destination devices 117 may include bridges, firewalls, gateways, laptop computers, mobile telephones, personal digital assistants, personal computers, routers, set top boxes, servers, switches, video game devices, workstations, or any other suitable device, customer premise equipment, etc., capable of routing functions, such as layer three routing (or data transfer) functions associated with the open systems interconnection (OSI) reference model. It is noted that routing nodes 105-109, source devices 115, and destination devices 117 may route transmission units over transport environment 111 based on one or more routing protocols, such as boarder gateway protocol (BGP), constrained shortest path first (CSPF), exterior gateway protocol (EGP), interior gateway routing protocol (IGRP), enhanced interior gateway routing protocol (EIGRP), intermediate system to intermediate system (IS-IS) protocol, routing information protocol (RIP), open shortest path first (OSPF), or any other suitable routing protocol.

According to exemplary embodiments, transport environment 111 may relate to any suitable wireline and/or wireless network. For example, transport environment may include one or more telephony networks, e.g., a circuit-switched network, such as the public switched telephone network (PSTN), an integrated services digital network (ISDN), a private branch exchange (PBX), or other like network. In other instances, transport environment may include one or more wireless networks that employ one or more access technologies, such as, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. According to various other embodiments, transport environment may include one or more data networks, such as one or more local area networks (LAN), metropolitan area networks (MAN), wide area networks (WAN), the Internet, or any other suitable packet-switched network, such as a commercially owned, proprietary packet-switched network having voice over internet protocol (VoIP) capabilities, e.g., a proprietary cable or fiber-optic network. To this effect, it is to be appreciated that transport environment 111 may comprise combinations of one or more of the aforementioned networks. It is further contemplated that transport environment 111 may include components and facilities to provide for signaling and/or bearer communications between the various components or facilities of system 100. In this manner, transport environment 111 may embody or include portions of a signaling system 7 (SS7) network, or other suitable infrastructure to support control and signaling functions between, for example, routing nodes 105-109 and network management system 101.

Furthermore, it is also noted that power consumption information repository 121 and power cost information repository 123 may be maintained by a network operator of transport environment 111 or any other suitable third-party. It is further contemplated that the physical implementation of repositories 121 and 123 may take on many forms, including, for example, portions of existing repositories of a network operator, new repositories of a network operator, third-party repositories, and/or shared-repositories. As such, repositories 121 and 123 may be configured for communication over system 100 (e.g., over transport environment 111, etc.) through any suitable messaging protocol, such as lightweight directory access protocol (LDAP), extensible markup language (XML), open database connectivity (ODBC), structured query language (SQL), configuration access protocol (CAP) and the like, as well as combinations thereof. In those instances when repositories 121 and 123 are provided in distributed fashions, information and content available via repositories 121 and 123 may be located utilizing any suitable querying technique, such as electronic number matching, distributed universal number discovery (DUNDi), uniform resource identifiers (URI), etc.

Figure 2:
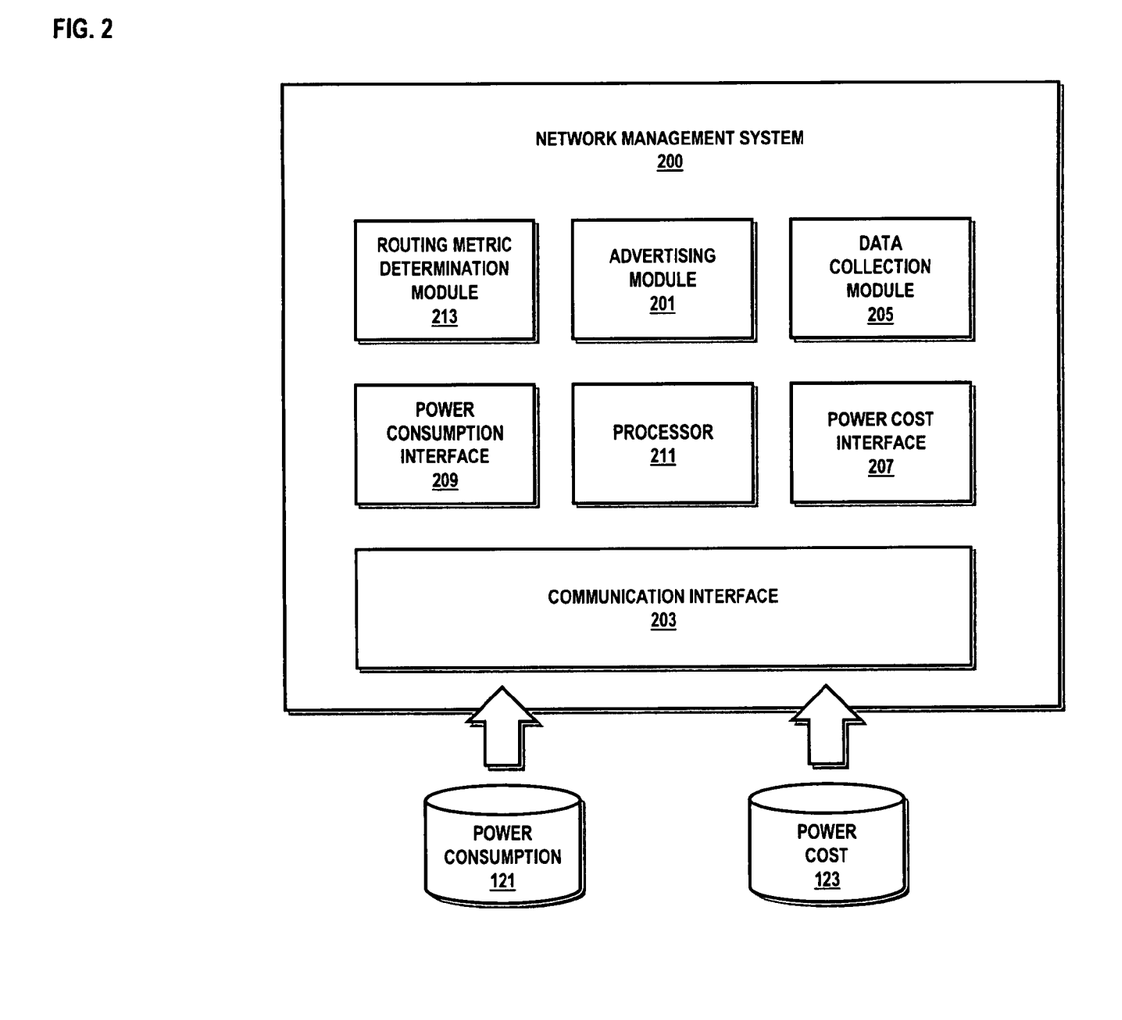
FIG. 2 is a diagram of a network management system configured to optimize power consumption and associated costs for routing transmission units over a transport environment via one or more routing nodes, according to an exemplary embodiment.

FIG. 2 is a diagram of a network management system configured to optimize power consumption and associated costs for routing transmission units over a transport environment via one or more routing nodes, according to an exemplary embodiment. Network management system 200 may comprise computing hardware (such as described with respect to FIG. 7), as well as include one or more components configured to execute the processes described herein. In one implementation, network management system 200 includes advertising module 201, communication interface 203, data collection module 205, power cost interface 207, power usage interface 209, processor 211, and routing metric determination module 213. Networking management system 200 may also communicate with one or more repositories, such as power information repository 215, which may include power consumption information and/or power cost information. While specific reference will be made to this particular implementation, it is contemplated that network management system 200 may embody other forms and include multiple and/or alternative components.

According to exemplary embodiments, data collection module 205 may be configured to collect within a plurality of collection intervals, respectively, a plurality of data sets specifying power consumption information and associated cost information for a plurality of routing nodes (e.g., routing nodes 105-109) associated with transport environment 111. This power consumption information and associated cost information may be stored to any suitable memory or other storage location, such as power consumption information repository 121 and power cost information repository 123. Accordingly, routing metric determination module 315 may utilize the power consumption information and associated power cost information for determining one or more routing metrics, wherein the routing metrics, at least, specify relative desirability of the plurality of routing nodes 105-109 for establishing one or more communication (or routing) paths formed by one or more of the plurality of routing nodes 105-109 based on the routing metrics. In this manner, advertising module 201 may be utilized for forwarding determined routing metrics to the plurality of routing nodes 105-109 of transport environment 111 for implementation, such as updating one or more routing tables (e.g., routing tables 113) utilized for establishing routing paths over transport environment 111. Exemplary processes for determining and advertising routing metrics are explained in more detail in association with FIGS. 4 and 5.

In order to gather power consumption information and associated cost information corresponding to routing nodes 105-109, network management system 200 includes power consumption interface 209 and power cost interface 207, which may be configured to retrieve (or receive) power cost information and/or associated power cost information based on one or more determined collection intervals specified by data collection module 205. According to certain embodiments, power consumption interface 209 may receive power consumption information from routing nodes 105-109 in real-time, over a predetermined interval, or in an on-demand fashion. In a similar fashion, power cost interface 207 may be configured to receive power cost information from either routing nodes 105-109 or from one or more power companies (not shown), which also may be received in real-time, over a predetermined interval, or in an on-demand fashion. It is noted that advertising module 201, power cost interface 207, and power consumption interface 209 may be part of a more comprehensive communication interface 203 utilized by network management system 200 for sending and receiving information over transport environment 111.

Additionally, network management system 200 may also include one or more processors (or controllers) 211 for effectuating the processes described herein, as well as one or more memories (not shown) for permanent or temporary storage of one or more commands, parameters, reports, variables, power consumption information, power cost information, etc. It is also noted that various features and/or functions of network management system 200 may be assumed, in part or in whole, by routing nodes 105-109.

Figure 3:
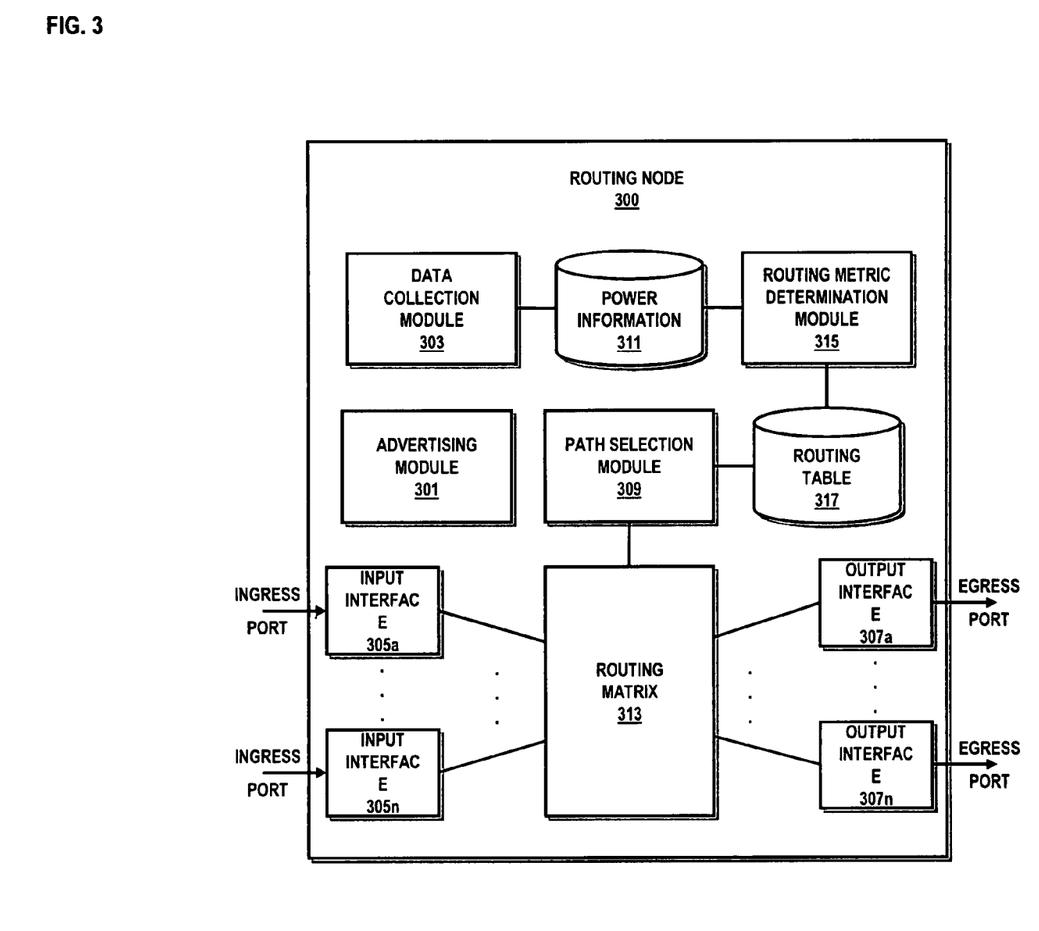
FIG. 3 is a diagram of a routing node configured to route transmission units according to routing metrics, according to an exemplary embodiment.

FIG. 3 is a diagram of a routing node configured to route transmission units according to routing metrics, according to an exemplary embodiment. Routing node 300 may comprise computing hardware (such as described with respect to FIG. 7), as well as include one or more components configured to execute the processes described herein. In one implementation, routing node 300 includes advertising module 301, data collection module 303, input interfaces 305a-305n, output interfaces 307a-307n, path selection module (or routing engine) 309, power information repository 311, routing matrix 313, routing metric determination module 315, and one or more routing tables 317. Furthermore, it is contemplated that the components of routing node 300 may be combined, located in separate structures, or separate physical locations.

According to one embodiment, input interfaces 303a-303n act as "n" input interfaces (ingress points) to routing node 300 from "n" transmitting sources (e.g., source device 115, other routing nodes, etc.) and, thereby, output interfaces 305a-305n act as "n" output interfaces (egress points) from routing node 300 to "n" destinations (e.g., destination device 117, other routing nodes, etc.). It is contemplated that input interfaces 305a-305n and output interfaces 307a-307n may include Ethernet interface cards, coaxial cable interfaces, asynchronous transfer mode interfaces, fiber optic interfaces, wireless network interfaces, and the like. As such, routing paths over transport environment 111 may include coaxial cable paths, Ethernet paths, fiber optic paths, wireless medium paths, power line communication paths, etc.

When transmission units arrive at routing node 300, input interfaces 305a-305n port the transmission units to routing matrix 313. In this manner, routing matrix 313 may utilize, for example, header information for routing purposes and may route, for example, payload content to destination output interfaces 307a-307n via a routing fabric (not illustrated) of routing matrix 313. That is, the routing fabric may route the payload content to appropriate routing pathways, whereby updated header information may be combined with routed payloads for forwarding onto a "next hop" routing node (e.g., routing node 107a) or destination device (e.g., destination device 117). Routing matrix 313 may route transmission units to corresponding output interfaces 307a-307n based on commands provided by path selection module 309 that, in turn, determines how to forward transmission units based on information stored to one or more routing tables 317.

In exemplary embodiments, routing tables 317 include, or are generated based on, routing metrics either advertised to routing node 300 via network management system 101, another routing node (e.g., routing node 107b), or determined by routing metric determination module 315. Routing table 317 may include information corresponding to routing paths over transport environment 111 that reduce (or otherwise optimize) power consumption and/or associated cost of power for routing transmission units from source device 115 to destination device 117 via one or more of routing nodes 105-109. In other words, routing tables 317 include transport environment topological information (e.g., available routing nodes for routing transmission units), as well as relative desirability information for selecting one routing node or routing path over another for forwarding transmission units onto their final destinations. Other routing metric information, such as available bandwidth, congestion, hop count, latency, reliability, speed, and the like, may also be stored to routing tables 317 for path selection purposes. To this effect, path selection module 309 may utilize the header information of received transmission units to identify a corresponding routing table 317 that maps a destination (e.g., destination device 117) to one or more forwarding or "next hop" routing nodes, as well as one or more paths over transport environment 111. Accordingly, path selection module 309 may append payloads routed via routing matrix 313 with updated header information for forwarding the packet to a "next hop" routing node or destination device utilizing a path that reduces or otherwise optimizes power consumption and/or associated cost for routing transmission units over transport environment 111. As previously mentioned, routing via routing node 300 may be based on one or more routing protocols, such as BGP, CSPF, EGP, IGRP, EIGRP, IS-IS, RIP, OSPF, or any other suitable routing protocol.

Data collection module 303 may be configured to collect within a plurality of collection intervals respectively a plurality of data sets specifying power consumption information and associated cost information for one or more neighboring nodes. This power consumption information and associated cost information may be stored to power information repository (or memory) 311. Accordingly, routing metric determination module 315 may utilize the information stored to power information repository 311 for determining one or more routing metrics. It is noted that data collection module 303 and routing metric determination module 315 of routing node 300 perform similarly to data collection module 205 and routing metric determination module 213; however, in exemplary embodiments, routing metric determination module 315 may also be configured to manage entries in routing tables 317, such as creating new entries, deleting existing entries, or modifying existing entries. As such, routing table 317 may be a graph, network depiction, table, etc., with corresponding power consumption and associated cost information relating to the desirability of various available routing paths over transport environment 111.

Advertising module 301 is utilized for forwarding routing metrics to adjacent routing nodes or to network management system 101 for distribution, modification, storage, etc. As such, updated to routing tables 317 by, for example, routing metric determination module 315 may trigger advertising module 301 to advertise new (or updated) routing metrics to adjacent routing nodes or to network management system 101. The routing metrics may be transmitted via conventional routing messages that are used to convey topological and link state information between and among routing nodes.

Figure 4:
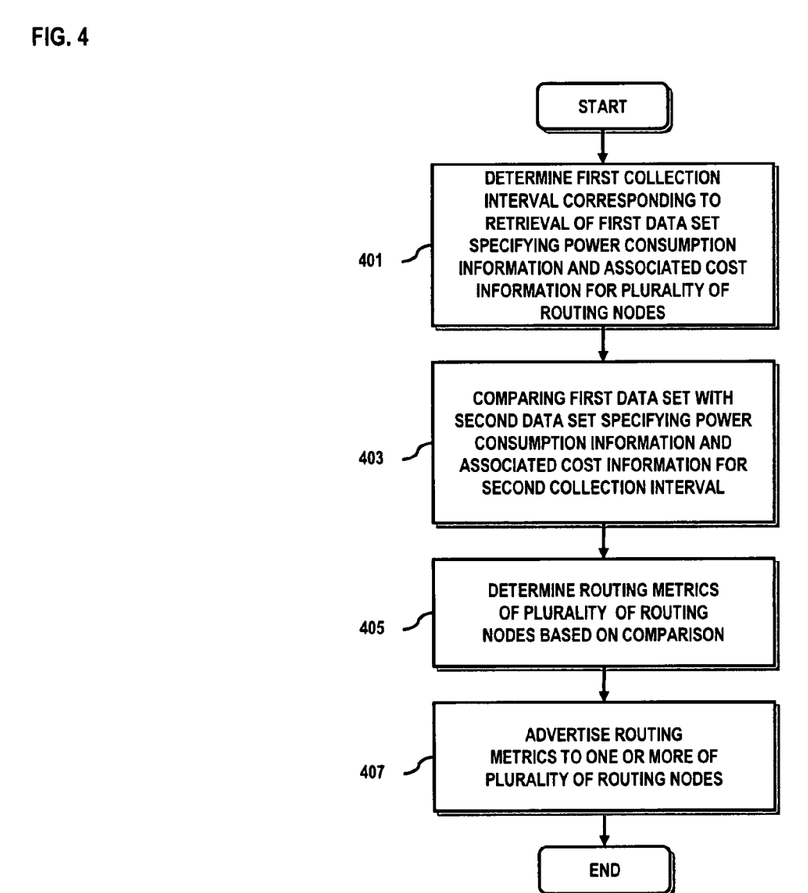
FIG. 4 is a flowchart of a process for advertising routing metrics, according to an exemplary embodiment.

FIG. 4 is a flowchart of a process for advertising routing metrics, according to an exemplary embodiment. For illustrative purposes, the process is described with respect to network management system 200 of FIG. 2; however, the process may be equivalently implemented via (or in conjunction with) routing node 300 of FIG. 3. It is also noted that the steps of the process may be performed in any suitable order, as well as combined or separated in any suitable manner.

At step 401, network management system 200 via data collection module 205 determines a first collection interval (e.g., one or more days, hours, minutes, seconds, etc.) corresponding to retrieving (or receiving) a first data set specifying power consumption information and associated cost information for a plurality of routing nodes (e.g., nodes 105-109). This information may be collected in real-time, on a periodic basis, or in an on-demand fashion and ported to, for example, routing metric determination module 213 for determining one or more routing metrics for optimizing power consumption and/or associated costs of routing transmission units over transport environment 111. Per step 403, routing metric determination module 213 may compare the first data set with a second data set (corresponding to the plurality of routing nodes 105-109) specifying power consumption information and associated cost information for a second collection interval. Comparing the first and second data sets may include determining relative differences between power consumption information and associated cost information between the first and second data sets and correlating the relative differences with one or more predetermined threshold values (or range of threshold values), e.g., maximum, minimum, etc., changes in power consumption and/or associated cost information.

Accordingly, in step 405, routing metric determination module determines one or more routing metrics based on the comparison of the first and second data sets in relation to, for example, the one or more threshold values (or range of values). In certain instances, the routing metrics may be determined based on one or more weighting factors between power consumption and associated cost information. An exemplary process for determining routing metrics is more fully described in conjunction with FIG. 5. Nevertheless, the routing metrics may specify a relative desirability for one particular routing node over other routing nodes for establishing one or more routing paths formed by one or more of the plurality of routing nodes based on the routing metrics, which seek to reduce or otherwise optimize power consumption and associated costs for routing transmission units over transport environment 111. As such, the determined routing metrics are advertised to one or more of the plurality of routing nodes 105-109 for implementation, i.e., for routing transmission units according to the routing metrics.

Figure 5:
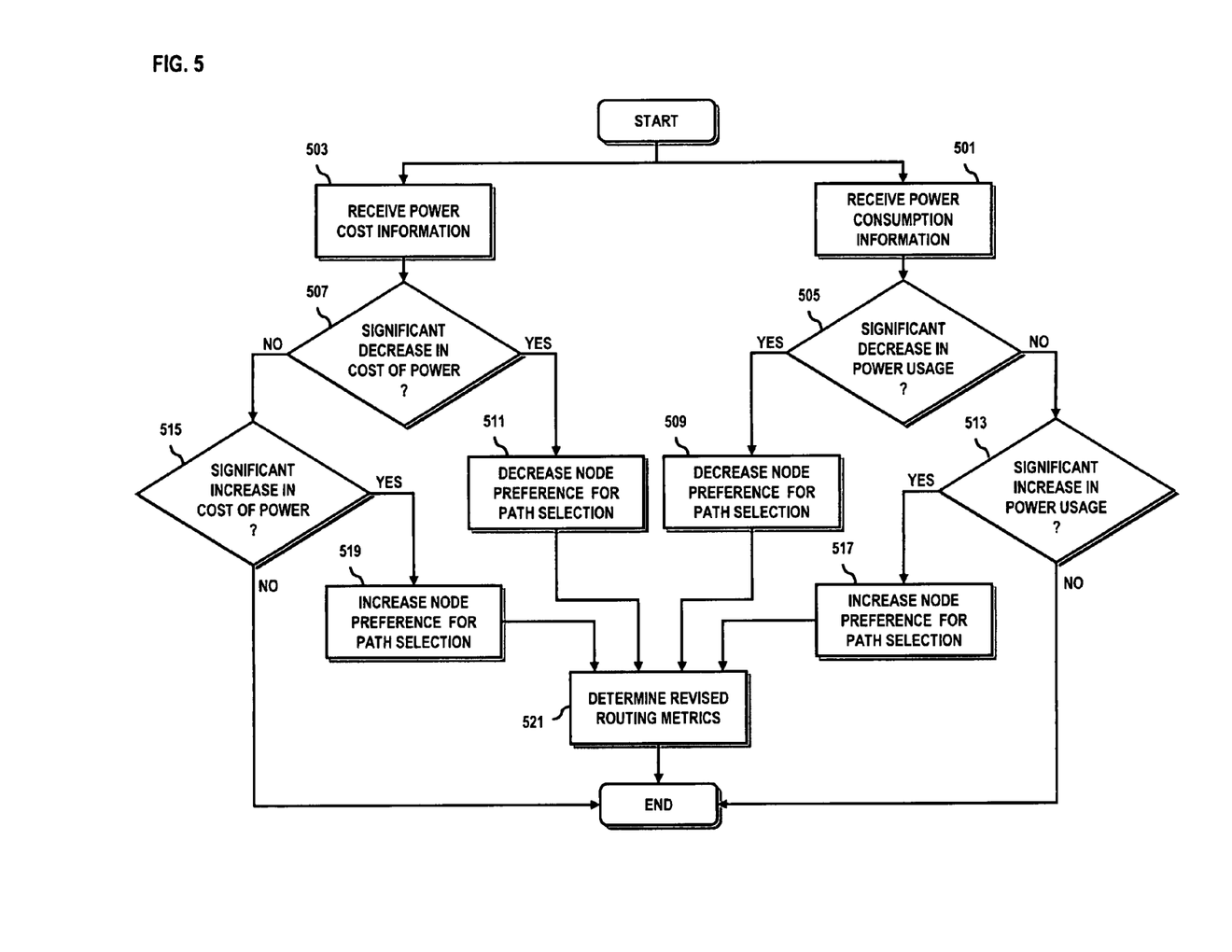
FIG. 5 is a flowchart of a process for determining routing metrics, according to an exemplary embodiment.

FIG. 5 is a flowchart of a process for determining routing metrics, according to an exemplary embodiment. For illustrative purposes, the process is described with respect to network management system 200 of FIG. 2; however, the process may be equivalently implemented via (or in conjunction with) routing node 300 of FIG. 3. Additionally, for the sake of simplicity, the process is described with respect to determining routing metrics for one particular routing node. It is also noted that the steps of the process may be performed in any suitable order, as well as combined or separated in any suitable manner. At steps 501 and 503, data collection module 205 receives power consumption information and associated power cost information based on, for example, one or more collection intervals, such as for a "current" interval of time, for a particular routing node (e.g., routing node 107a). In steps 505 and 507, routing metric determination module 213 compares the received power consumption information and received power cost information with power consumption information and associated power cost information associated with one or more other determined collection intervals, such as for a "previous" interval of time, as well as compared with one or more threshold values. If, for instance, there is a "significant" relative change (e.g., decrease) in either power consumption or cost of power for routing node 109, then the preference of routing node 107a may be decreased in terms of desirability for path selection, per steps 509 and 511. It is noted that "significant" may entail a relative change greater than or equal to a predetermined threshold value. If, however, there is not a "significant" relative decrease in the power consumption or associated cost of power for routing node 107a, then (in steps 513 and 515) routing metric determination module 213 determines whether a "significant" relative change (e.g., increase) in either the power consumption or cost of power exists, e.g., whether there exists an increase greater than or equal to a second threshold value. If there is a "significant" relative increase in the power consumption or cost of power for routing node 107a, then the preference of routing node 107a may be increased in terms of desirability for path selection, per steps 517 and 519. If there is not a "significant" increase or decrease, then the process ends, otherwise (per step 521), routing metric determination module 213 determines routing metrics based on the increases or decreases in routing node preference for path selection.

Figure 6:
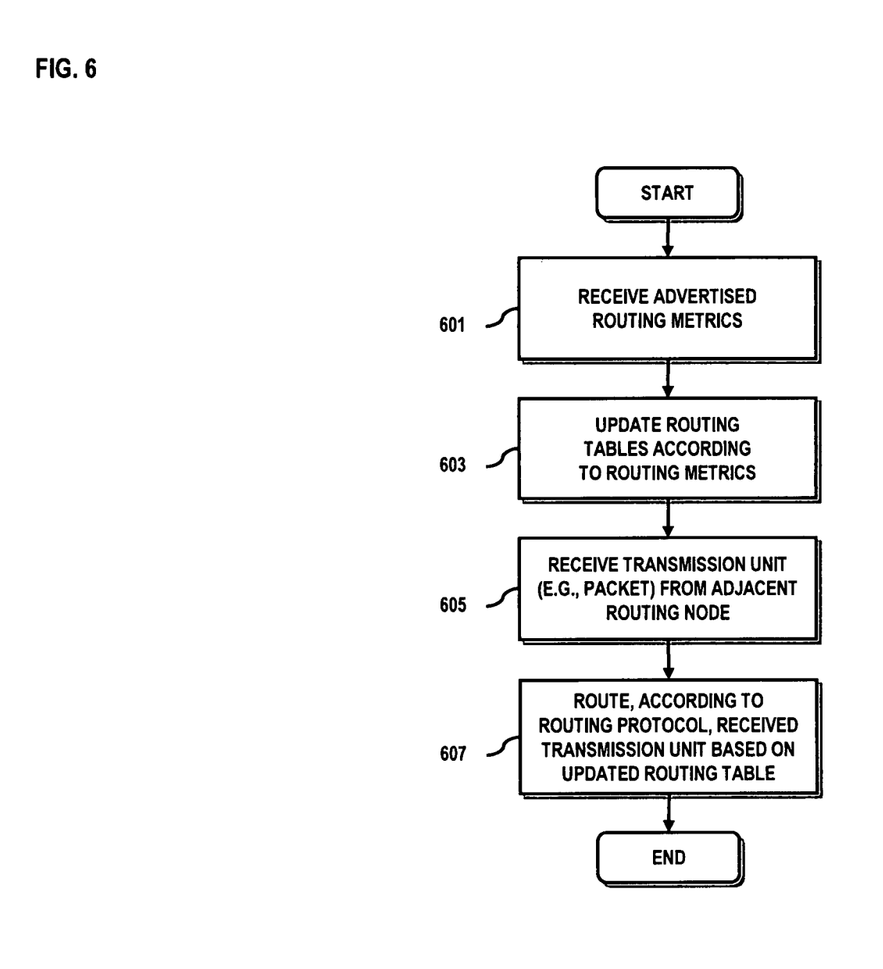
FIG. 6 is a flowchart of a process for routing transmission units according to routing metrics, according to an exemplary embodiment.

FIG. 6 is a flowchart of a process for routing transmission units according to routing metrics, according to an exemplary embodiment. For illustrative purposes, the process is described with respect to routing node 300 of FIG. 3. It is also noted that the steps of the process may be performed in any suitable order, as well as combined or separated in any suitable manner. At step 601, routing node 300 receives advertised routing metrics from, for example, network management system 200. The routing metrics are utilized by, for example, routing metric determination module 315 to update routing table 317, in step 603, such that path selection module 309 may forward received transmission units based on "updated" routing paths that reduce or otherwise optimize power consumption and/or associated costs. Accordingly, per step 605, a transmission unit is received at routing node 300 via an input interface (e.g., input interface 305a) from an adjacent routing node (e.g., routing node 105) or source device 115. The transmission unit is ported to routing matrix 313, where header information is utilized by path selection module 309 to identify a corresponding routing table 317 for forwarding the transmission unit to a "next hop" routing node (e.g., routing node 109) or destination device 117. Thus, utilizing a particular routing table 317 and the information stored therein, path selection module 309 routes the transmission unit to an output interface (e.g., output interface 307n) based on the routing preferences that reduce (or otherwise optimize) power consumption and/or associated cost for routing the transmission unit to its final destination (e.g., destination device 117), per step 607. It is noted, however, that the power consumption and associated cost routing metrics may be combined with other routing metrics and algorithms for routing transmission units over transport environment 111.

The processes described herein for optimizing power consumption and costs associated with routing information over a transport environment may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
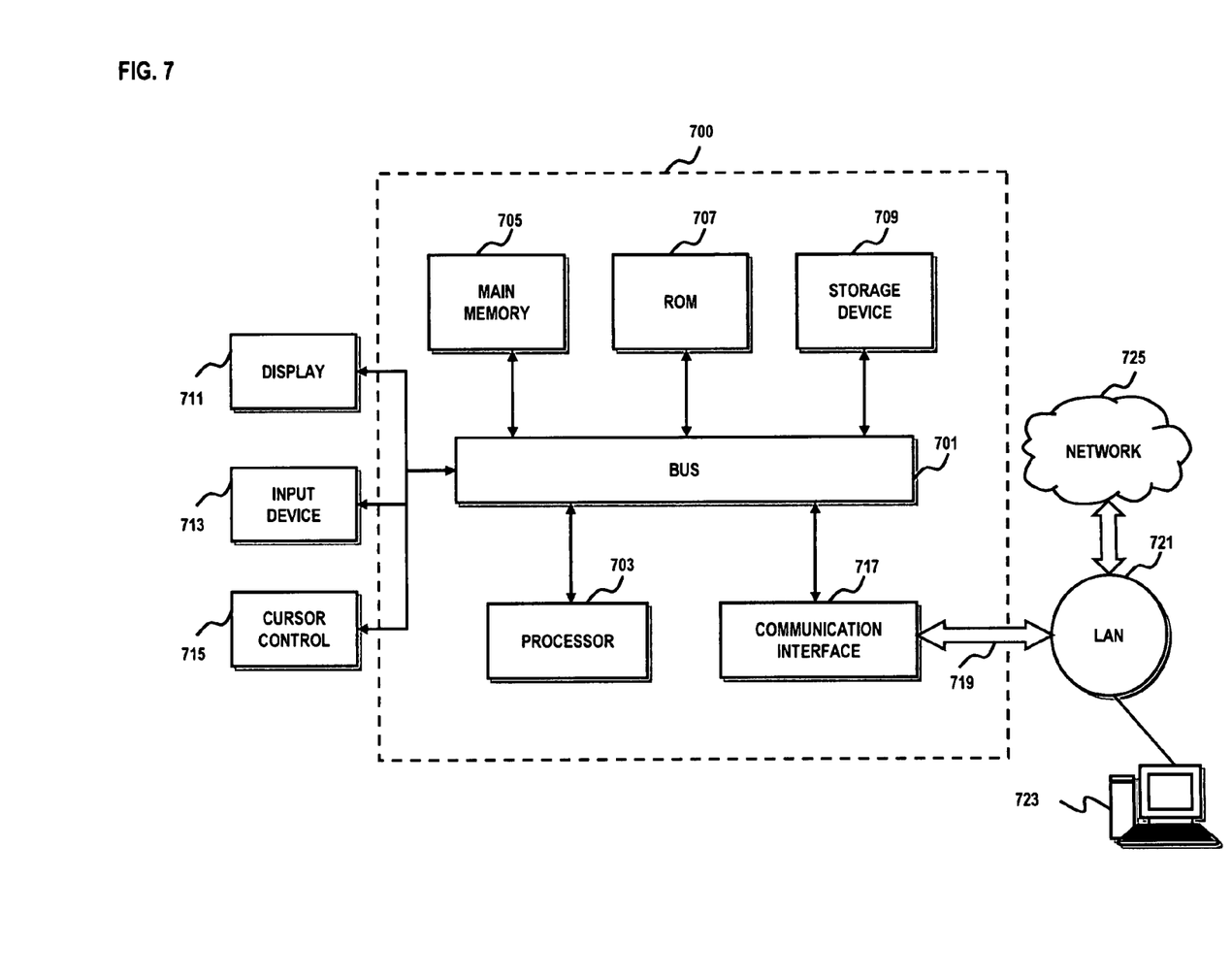
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining a first collection interval corresponding to retrieval of a first data set specifying first power consumption information and first associated power cost information for a plurality of routing nodes during the first collection interval, the first power consumption information including actual power consumed by the plurality of routing nodes during operation within the first collection interval;
   comparing the first data set with a second data set specifying second power consumption information and second associated power cost information for the plurality of routing nodes during a second collection interval, the second power consumption information including actual power consumed by the plurality of routing nodes during operation within the second collection interval; and
   determining, by at least one processor, routing metrics of the plurality of routing nodes based on the comparison of the first data set with the second data set,
   wherein the routing metrics specify relative desirability of the plurality of routing nodes for establishing one or more communication paths formed by one or more of the plurality of routing nodes based on the routing metrics,
   wherein the routing metrics are determined based upon fluctuations in power consumption information of the plurality of routing nodes, fluctuations in associated power cost information, or a combination thereof.

2. The method according to claim 1, wherein the determining and the retrieval of the first data set occur in real-time.

3. The method according to claim 1, wherein the routing metrics are further determined based upon a weighting between the first and second power consumption information and the first and second associated power cost information.

4. The method according to claim 1, wherein the routing metrics are increased or decreased either directly, by percentage, or logarithmically.

5. The method according to claim 1, further comprising:
advertising the routing metrics to one or more of the plurality of routing nodes;
receiving a packet; and
routing the packet to one of the routing nodes based on the routing metrics according to a routing protocol.

6. The method according to claim 1, wherein the first power consumption information includes actual power consumed in maintaining environmental conditions within one or more buildings housing the plurality of routing nodes.

7. The method according to claim 1, further comprising:
determining relative differences between the first power consumption information and the second power consumption information, and the first associated power cost information and the second associated power cost information; and
correlating the relative differences with one or more thresholds,
wherein one or more of the routing metrics are increased or decreased based on the correlation of the relative differences.

8. An apparatus comprising:
at least one processor configured to:
determine a first collection interval corresponding to retrieval of a first data set specifying first power consumption information and first associated power cost information for a plurality of routing nodes during the first collection interval, the first power consumption information including actual power consumed by the plurality of routing nodes during operation within the first collection interval, and
compare the first data set with a second data set specifying second power consumption information and second associated power cost information for the plurality of routing nodes during a second collection interval, the second power consumption information including actual power consumed by the plurality of routing nodes during operation within the second collection interval, and
determine routing metrics of the plurality of routing nodes based on the comparison of the first data set with the second data set,
wherein the routing metrics specify relative desirability of the plurality of routing nodes for establishing one or more communication paths formed by one or more of the plurality of routing nodes based on the routing metrics,
wherein the routing metrics are determined based upon fluctuations in power consumption information of the plurality of routing nodes, fluctuations in associated power cost information, or a combination thereof.

9. The apparatus according to claim 8, wherein the determination and the retrieval of the first data set occur in real-time.

10. The apparatus according to claim 8, wherein the routing metrics are further determined based upon a weighting between the first and second power consumption information and the first and second associated power cost information.

11. The apparatus according to claim 8, wherein the routing metrics are increased or decreased either directly, by percentage, or logarithmically.

12. The apparatus according to claim 8, wherein the routing metric determination module is further configured to advertise the routing metrics to one or more of the plurality of routing nodes, the apparatus further comprising:
a routing engine configured to receive a packet, and to route the packet to one of the routing nodes based on the routing metrics according to a routing protocol.

13. The apparatus according to claim 8, wherein the first power consumption information includes actual power consumed in maintaining environmental conditions within one or more buildings housing the plurality of routing nodes.

14. The apparatus according to claim 8, wherein the routing metric determination module is further configured to:
determine relative differences between the first power consumption information and the second power consumption information, and the first associated power cost information and the second associated power cost information; and
correlate the relative differences with one or more thresholds, and
wherein one or more of the routing metrics are increased or decreased based on the correlation of the relative differences.

15. A system comprising:
a router configured to collect within a plurality of collection intervals respectively a plurality of data sets specifying real-time power consumption information and associated power cost information for one or more neighboring routers during the plurality of collection intervals, the power consumption information including actual power consumed by the one or more neighboring routers during operation within the plurality of collection intervals,
wherein the router is further configured to compare a first one of the data sets with a second one of the data sets, and to determine routing metrics of the one or more neighboring routers,
wherein the routing metrics are determined based upon fluctuations in power consumption information of the plurality of routing nodes, fluctuations in associated power cost information, or a combination thereof.

16. The system according to claim 15, wherein the routing metrics are further determined based upon a weighting between the power consumption information and the associated power cost information.

17. The system according to claim 15, wherein the router is further configured to receive a packet, and to route the packet to one of the neighboring routers based on the routing metrics according to an interior gateway protocol.

18. The system according to claim 15, wherein the router is further configured to:
determine relative differences between power consumption information between the first data set and the second data set, and associated power cost information between the first data set and the second data set,
correlate the relative differences with one or more thresholds, and
adjust one or more of the routing metrics based on the correlation.

* * * * *